United States Patent [19]
Clise et al.

[11] Patent Number: 5,797,091
[45] Date of Patent: Aug. 18, 1998

[54] PERSONAL COMMUNICATION SYSTEM AND METHOD OF USE

[75] Inventors: William E. Clise; Richard Michael Crowson, both of Seattle, Wash.

[73] Assignee: Xypoint Corporation, Seattle, Wash.

[21] Appl. No.: 399,725

[22] Filed: Mar. 7, 1995

[51] Int. Cl.⁶ .................................................. H04Q 7/20
[52] U.S. Cl. .......................... 455/404; 455/456; 455/564
[58] Field of Search ................................. 379/58, 59, 63, 379/40, 45, 37, 41, 42; 455/33.1, 54.1, 89, 90, 404, 456, 457, 466, 521, 550, 564; 342/357; 340/988, 989, 991

[56] References Cited

U.S. PATENT DOCUMENTS

| | | |
|---|---|---|
| 4,494,119 | 1/1985 | Wimbush . |
| 4,651,156 | 3/1987 | Martinez . |
| 4,891,638 | 1/1990 | Davis . |
| 4,891,650 | 1/1990 | Sheffer . |
| 4,952,928 | 8/1990 | Carroll et al. . |
| 5,014,206 | 5/1991 | Scribner et al. . |
| 5,043,736 | 8/1991 | Darnell et al. .................. 342/359 |
| 5,055,851 | 10/1991 | Sheffer . |
| 5,068,656 | 11/1991 | Sutherland . |
| 5,070,329 | 12/1991 | Jasinaki . |
| 5,081,667 | 1/1992 | Drori et al. ..................... 379/59 |
| 5,119,104 | 6/1992 | Heller . |
| 5,177,478 | 1/1993 | Wagai et al. . |
| 5,208,756 | 5/1993 | Song . |
| 5,214,789 | 5/1993 | George . |
| 5,218,367 | 6/1993 | Sheffer . |
| 5,223,844 | 6/1993 | Mansell et al. . |
| 5,266,944 | 11/1993 | Carroll et al. . |
| 5,289,527 | 2/1994 | Tiedemann, Jr. . |
| 5,293,642 | 3/1994 | Lo . |
| 5,325,302 | 6/1994 | Izidon et al. . |
| 5,343,493 | 8/1994 | Karimullah . |
| 5,361,212 | 11/1994 | Class et al. . |
| 5,363,425 | 11/1994 | Mufti et al. . |
| 5,374,936 | 12/1994 | Feng . |
| 5,379,451 | 1/1995 | Nakagoshi et al. . |
| 5,381,338 | 1/1995 | Wysocki et al. . |
| 5,387,993 | 2/1995 | Heller et al. . |

(List continued on next page.)

FOREIGN PATENT DOCUMENTS 9013196  11/1990  WIPO .

*Primary Examiner*—Dwayne D. Bost
*Assistant Examiner*—William G. Trost
*Attorney, Agent, or Firm*—Knobbe, Martens, Olson & Bear, LLP

[57] ABSTRACT

A personal communication system for communication with another entity uses global positioning system receiver, phone book storage, and audio input as alternative forms of generating position data. A transmitter communicates a service request and the position data to the other entity, which in turn, relays the request to the appropriate party. Alternatively, the personal communicator may directly contact the desired individual. The personal communicator also includes a plurality of command buttons to control operation and a display to provide the user with instructions and data. The personal communicator also includes a sound generator to generate a loud sound upon manual command by the user or by remote command from the other entity. The transmitter can be an analog data link or part of any packet data radio communication link.

19 Claims, 5 Drawing Sheets

U.S. PATENT DOCUMENTS

| | | | |
|---|---|---|---|
| 5,388,147 | 2/1995 | Grimes | 379/59 |
| 5,390,339 | 2/1995 | Bruckert et al. | |
| 5,394,158 | 2/1995 | Chia | |
| 5,396,227 | 3/1995 | Carroll et al. | |
| 5,398,190 | 3/1995 | Wortham | |
| 5,406,614 | 4/1995 | Hara | |
| 5,418,537 | 5/1995 | Bird | |
| 5,423,076 | 6/1995 | Westergren et al. | |
| 5,432,841 | 7/1995 | Rimer | |
| 5,434,789 | 7/1995 | Fraker et al. | |
| 5,461,390 | 10/1995 | Hoshen | |
| 5,470,233 | 11/1995 | Fruchterman et al. | |
| 5,479,408 | 12/1995 | Will | |
| 5,479,482 | 12/1995 | Grimes | |
| 5,485,161 | 1/1996 | Vaughn | |
| 5,485,163 | 1/1996 | Singer et al. | |
| 5,488,563 | 1/1996 | Chazelle et al. | |
| 5,497,149 | 3/1996 | Fast | |
| 5,508,931 | 4/1996 | Snider | |
| 5,513,243 | 4/1996 | Kage | |
| 5,515,287 | 5/1996 | Hayoyama et al. | |
| 5,519,403 | 5/1996 | Bickley et al. | |
| 5,532,690 | 7/1996 | Hertel | |
| 5,535,434 | 7/1996 | Siddoway et al. | |
| 5,539,398 | 7/1996 | Hall et al. | |
| 5,552,772 | 9/1996 | Janky et al. | |
| 5,555,286 | 9/1996 | Tendler | 379/59 |
| 5,568,119 | 10/1996 | Schinpper et al. | |
| 5,574,648 | 11/1996 | Pilley | |
| 5,588,009 | 12/1996 | Will | |
| 5,604,486 | 2/1997 | Lauro et al. | |
| 5,606,313 | 2/1997 | Allen et al. | |
| 5,606,850 | 3/1997 | Nakamura | |
| 5,610,815 | 3/1997 | Gudat et al. | |
| 5,614,890 | 3/1997 | Fox | |
| 5,615,116 | 3/1997 | Gudat et al. | |
| 5,621,793 | 4/1997 | Bednarek et al. | |

5,797,091

PERSONAL COMMUNICATION SYSTEM AND METHOD OF USE

TECHNICAL FIELD

The present invention is related generally to communications systems and, more specifically, to a personal communication system and method for communicating with and providing positioning data to another entity.

BACKGROUND OF THE INVENTION

Modern communications allow one person to contact another person virtually anywhere in the world at any time. Modern communications can include voice communication and data communication, including facsimile data. Devices such as a cellular telephone allow continuous contact with the individual carrying the cellular telephone at almost any location in the world. Cellular telephones have been life saving devices when hikers have been injured and call for help. Similarly, cellular telephones can be used to summon roadside assistance for a disabled automobile or to call for emergency services such as police, fire department, ambulance, or the like.

Another example of modern communication devices is personal paging systems, which have become sophisticated communication tools instead of a simple device that merely transmits a telephone number from a central transmitter to the paging device of an individual. Paging devices are relatively inexpensive devices that can relay a message to an individual.

All of these modern communication devices provide the user a greater sense of security because of their ability to communicate from remote locations. Even though some modern forms of communications have been credited with saving lives, they suffer from the drawback that they do not provide data to indicate the position of the user and the nature of a request for assistance. There are devices that provide the user with data related to the position of the user, but these devices are not completely reliable. Therefore, there exists a significant need for a personal communications device that provides accurate and reliable position data, and provides an indication of the nature of assistance requested by the user. The present invention provides these and other related advantages, as will become apparent from the following description and accompanying figures.

SUMMARY OF THE INVENTION

The present invention is embodied in a portable personal communicator system to provide communication between an individual and another entity such as a communications center, a portable communications facility, another personal communicator, or the like. The communicator includes a housing sized to be personally portable by a user. A power supply connector within the housing provides electrical power to the system. A position location circuit within the housing powered by the electrical power provides position data to indicate the location of the user. A transmitter within the housing and powered by the electrical power transmits the position data from the personal communicator to the other entity. A plurality of command buttons coupled to the housing and responsive to user input control communication between the personal communicator and the communications center. At least one of the plurality of buttons is designated as an emergency button with at least a second of the plurality of command buttons being designated as a non-emergency button. A sound generator within the housing powered by the electrical power generates an audible sound in response to the sound generation command.

In one embodiment the position location circuit includes a global positioning system circuit. In an alternative embodiment the personal communicator includes a phone book storage area containing a plurality of entries including location data corresponding to each of the plurality of data entries. The user selects a particular one of the data entries, and the transmitter transmits the corresponding position data to the other entity. In yet another alternative embodiment, the personal communicator includes an audio input circuit to permit user entry of audio data wherein the position location circuit includes the audio input circuit. The audio input circuit may include an analog to digital converter. The transmitter transmits audio data as position data.

The personal communicator may also include a receiver within the housing and powered by the electrical power to receive command data from the other entity. The personal communicator may also include a display coupled to the housing and viewable by the user to display messages, user selections, and receive command data. In this embodiment the sound generator command may be generated in response to a remote command from the other entity to the receiver. Alternatively, the sound generator command may be manually generated in response to user activation of another button.

In a presently preferred embodiment, the personal communicator is self-powered by a battery contained within the housing. Alternatively, the electrical power may be provided by a solar cell coupled to the housing or other power source.

DETAILED DESCRIPTION OF THE INVENTION

The present invention is a personal communicator that provides a complete communications package with several modes of communications, including normal and emergency communications. In addition, the personal communicator provides position data to another entity, such as a central communications facility, a portable communications facility, another personal communicator, or the like. The present invention is not limited by the specific form of the other entity. The personal communicator can be remotely operated from the other entity. The personal communicator is small enough to fit easily in the hand of the user and incorporates battery saving technology that allow the device to operate for prolonged periods of time on a single set of batteries. The portable self-powered personal communicator can be used virtually anywhere in the world.

Figure 1:
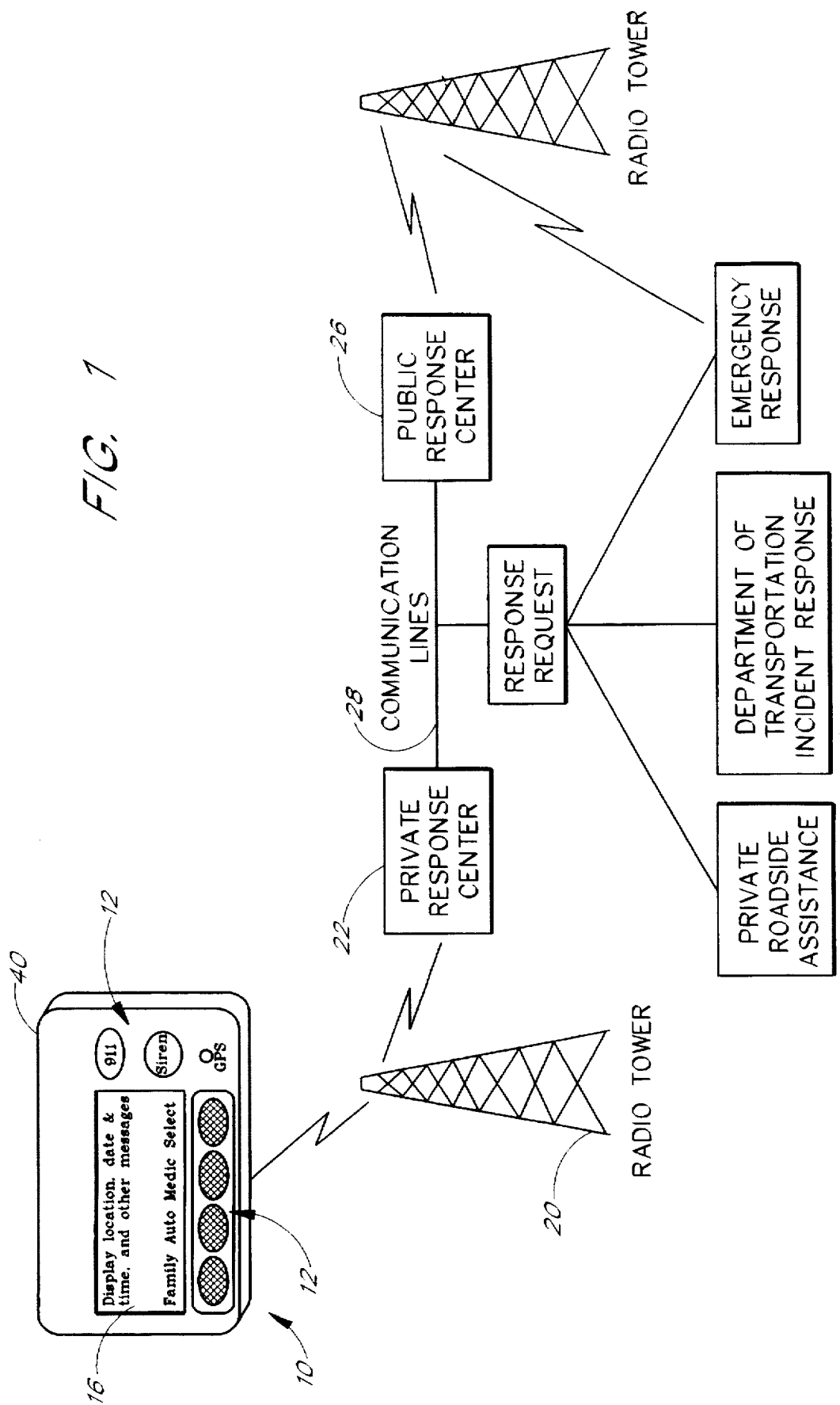
FIG. 1 illustrates the communications link of the present invention.

The personal communicator of the present invention operates in conjunction with several existing forms of communications to provide a nearly complete worldwide communications link. The operation of the communications link of the present invention is illustrated in the functional block diagram of FIG. 1. A personal communicator 10 is operated by an individual user. The personal communicator 10 includes several command buttons 12 and a display 16. In response to user input, the personal communicator 10 transmits data to a radio tower 20. The various forms of radio transmission will be discussed in greater detail below. The transmitted data is relayed from the radio tower 20 to another entity 22, which is shown in FIG. 1, by way of an example, as a private response center that monitors a plurality of personal communicators 10. Such private response centers are conventionally used to monitor intrusion detection systems, fire alarms, and the like. While the following description illustrates the communication between the personal communicator 10 and the central communications facility, those skilled in the art will appreciate that the other entity 22 can take many forms. Other examples of the other entity 22 that are not shown herein, include a mobile communications center, other personal communicators of the present design, or conventional communications devices such as a telephone, modem, or the like. The present invention is directed to the personal communicator 10 and is intended to encompass all forms of the other entity 22.

Personnel at the other entity 22 interpret the relayed data and determine the type of response that is requested. The requested response may involve contacting an emergency response center 26, such as the police, fire department, or ambulance. Communications between the central communications facility 22 and the emergency response facility 26 are typically carried over communications lines 28, such as conventional telephone lines, radio communications, or the like. The personnel at the emergency response facility 26 can contact the necessary parties, such as the police, in a conventional manner.

Alternatively, the personal communicator 10 may directly contact the other entity 22 to perform the requested service. For example, if the data from the personal communicator 10 includes a request for roadside assistance, the personal communicator 10 can directly contact the user's auto club, a nearby service station, or the like. Similarly, the personal communicator 10 may directly contact specified individuals, such as the user's family, to relay a message from the user to the specified individual.

A key element of the personal communicator 10 is its ability to provide position data to the other entity 22. Obviously, it is of little value to notify the police of an assault on the user if the precise location of the user cannot be determined. In some cases, the user himself may not be aware of his precise location. The personal communicator 10 includes circuitry to provide position data to the other entity 22.

Figure 2:
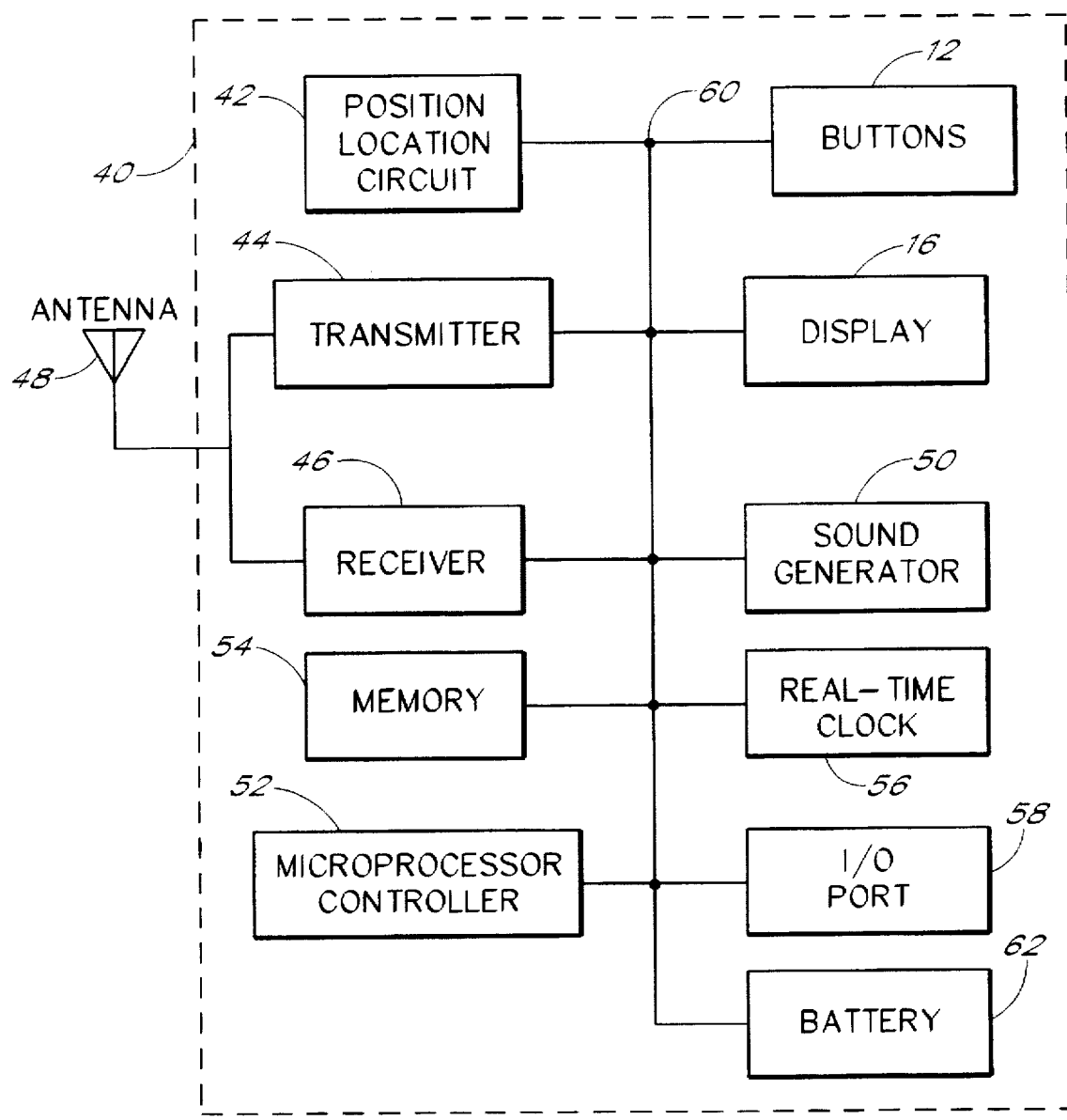
FIG. 2 is a functional block diagram of the personal communicator of FIG. 1.

The personal communicator 10 is shown in the functional block diagram of FIG. 2. The personal communicator 10 is contained within a housing 40 sized to fit easily in one hand of the user. The housing 40 is typically about the size of a conventional paging device. Contained within the housing 40 are a position location circuit 42, a transmitter 44 and a receiver 46. The transmitter 44 and the receiver 46 are coupled to an antenna 48. The command buttons 12 and the display 16 are coupled to the housing 40. To minimize power consumption, the display 16 is a liquid crystal display. The personal communicator 10 also includes a sound generator 50 capable of generating a loud siren-like sound having greater than 100 decibels of sound pressure (dB SPL). As will be discussed in greater detail below, the function of the personal communicator 10 can be remotely controlled. The remote control of the sound generator 50 is particularly advantageous in situations where the individual may be sick, injured, or incapacitated and cannot manually activate the sound generator.

The functions within the personal communicator 10 are controlled by a conventional microprocessor controller 52. The microprocessor controller 52 uses a memory 54, which may contain both read-only memory (ROM) and random access memory (RAM). A real time clock 56 provides the personal communicator 10 with timing capability. An optional input/output (I/O) port 58 allows the personal communicator 10 to be coupled to an external device such as a computer (not shown). The I/O port 58 can be a serial port, a parallel port, a network connector port, telephone interface, or the like. The various components are connected together by a bus 60, which may carry power and control signals as well as data signals.

The components in the personal communicator 10 are powered by a battery 62, which is a conventional rechargeable battery. A connector (not shown) coupled to the housing 40 allows the battery 62 to be recharged. Alternatively, the battery 62 could be a disposable battery. The personal communicator 10 incorporates power saving techniques, such as cycling portions of the electrical circuitry on and off periodically. Under normal use the expected life of the battery is one to two weeks. However, as those skilled in the art can readily appreciate, increased use of the personal communicator 10 will decrease the life of the battery 62 proportionally. Those skilled in the art readily recognize that the battery 62 could be replaced by other means of power such as solar cells (not shown) or an external power supply such as power provided through an automobile cigarette lighter. The present invention is not limited by the source of power to the personal communicator 10.

Figure 3:
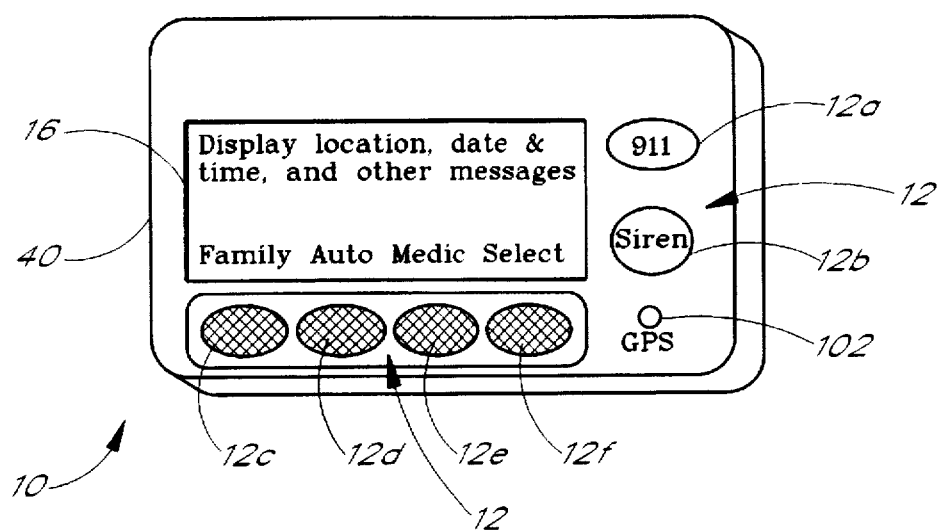
FIG. 3 depicts the front panel of the personal communicator of FIG. 1.

The personal communicator 10 contains several buttons 12 to control the operation of the device. As shown in FIG. 3, the personal communicator 10 contains an emergency button 12a, which is labeled "911." When the user activates the emergency request function by depressing the emergency button 12a, the personal communicator 10 transmits the emergency request to the other entity 22 along with position data from the position location circuit 42 (see FIG. 2). The other entity 22 relays the emergency request and position data to the proper authorities.

A siren button 12b can be activated by the user to enable the sound generator 50 (see FIG. 2). The sound generator 50 can attract attention to the user if the user is in distress, such as a medical emergency or if the user is being assaulted. The sound generator 50 can also be used to locate the user. This function is particularly important if the user is not in plain view. To this end, the sound generator 50 can also be remotely activated by the other entity 22. The receiver 46 accepts commands from the other entity 22 and the personal communicator 10 responds to the received commands. As an example of the remote activation of the sound generator 50, consider that the user activated the emergency button 12a, but that the user is in a building and cannot be seen from the street. The personnel at the other entity 22 can provide position data to the authorities, and can then remotely activate the sound generator 50 when an emergency response team has arrived in the vicinity. Thus, the sound generator 50 provides the authorities with additional assistance in locating the user. Other functions of the personal communicator 10 can also be remotely controlled, as will be described below.

In addition to the emergency button 12a and the siren button 12b, the personal communicator 10 has several programmable buttons whose functions can be designated by the user. In the example of FIG. 3, the button 12c has been designated as a FAMILY button. When the user activates the FAMILY button 12c, the personal communicator 10 contacts the other entity 22 (i.e., the designated family contact) directly or by having the central communications facility relay the request to the designated family contact. The relay of service requests from personal communicator 10 to the designated individual can be done manually by personnel at the other entity 22 or automatically. The automatic relay of data, such as message forwarding, is well known in the art and need not be described herein. Similarly, an AUTO button 12d, a MEDIC button 12e and a SELECT button 12f provide the user with a plurality of service requests. For example, the user generates an automobile service request by depressing the AUTO button 12d. The other entity 22 relays the automobile service request and position data to the automobile service facility listed in the user's subscriber record.

The SELECT button 12f is used to select programmable features of the personal communicator 10. For example, in one embodiment, the SELECT button 12f is used to activate the FAMILY button 12c, the AUTO button 12d, or the MEDIC button 12e. The user depresses one of the programmable buttons 12c, 12d, or 12e, followed by the SELECT button 12f to activate the selected function. This dual button activation requirement serves to prevent accidental activation of the personal communicator 10. Those skilled in the art will recognize that alternative techniques can be used to prevent accidental activation of the personal communicator 10. For example, the user can depress a selected function, such as the AUTO button 12d, for a predetermined period of time to activate the selected function.

As previously stated, the buttons 12c, 12d, 2e, and 12f are programmable. The functional labels for each of these buttons is provided by the display 16. These programmable buttons can be customized to fit the needs of each individual user. For example, at a first time the FAMILY button 12c could be a request such as contact the user's home when he leaves from work at the end of the day. The SELECT button 12f could be used to activate additional functions for the same button 12c with the label on the display 16 for the button 12c being changed to reflect the newly selected function. For example, the FAMILY button 12c could be relabeled as WORK button 12c, so that activation of the WORK button 12c could be a request such as contact the user's office when he leaves for work at the start of the day. Thus, the personal communicator 10 provides the unique capability of multiple messages and service requests that are easily altered by the user.

Figure 4:
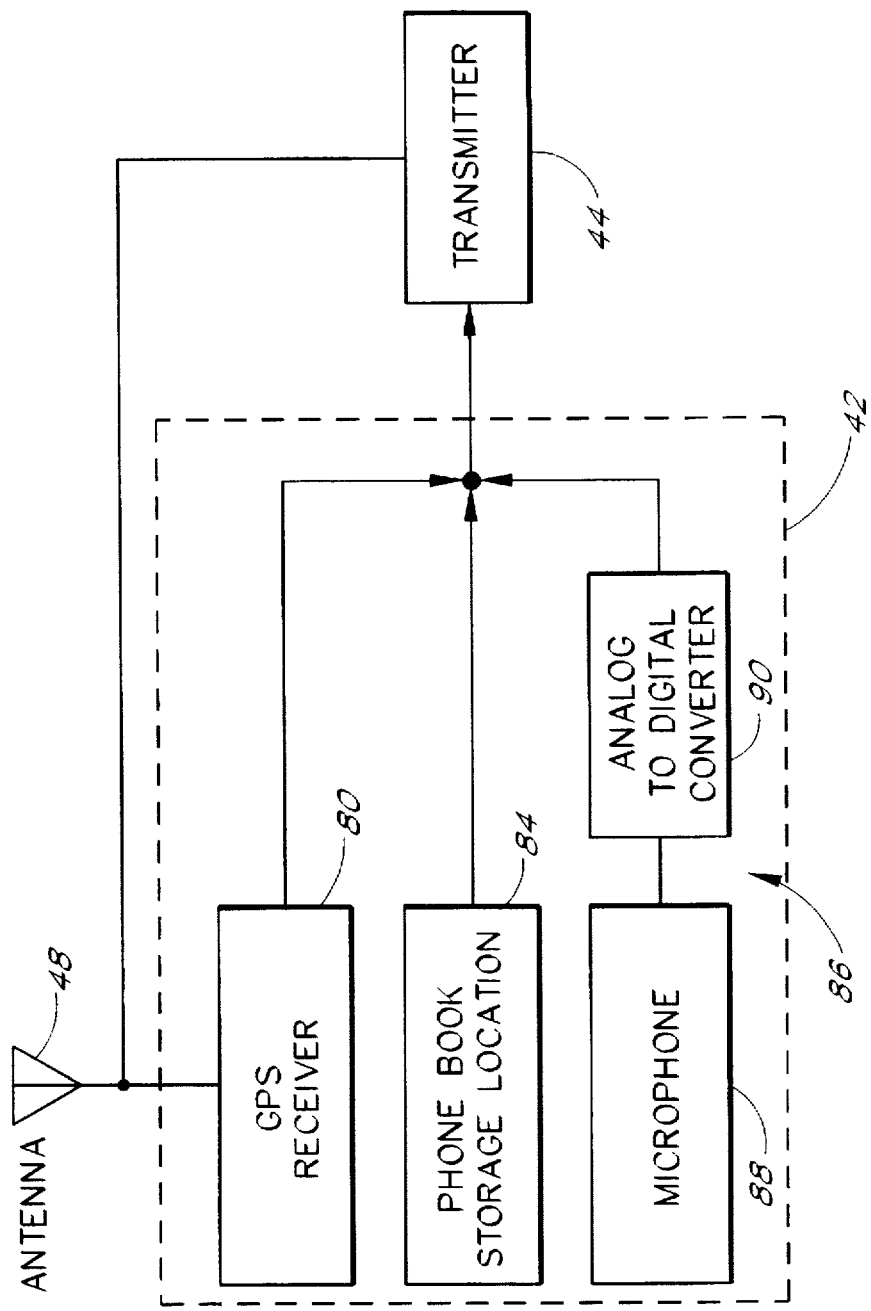
FIG. 4 illustrates the various circuits to generate position data used by the personal communicator of FIG. 1.
Figure 5:
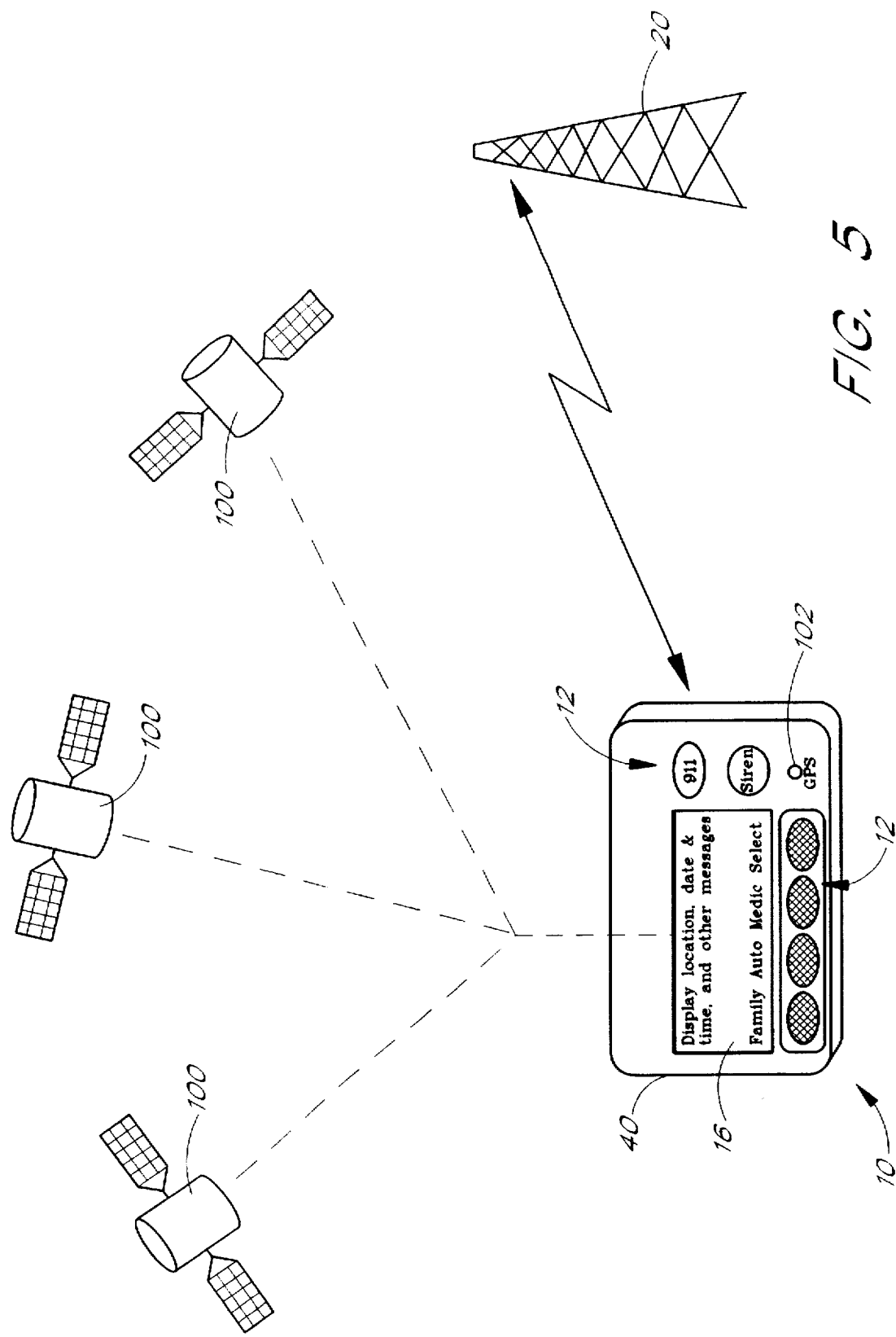
FIG. 5 illustrates the use of a global positioning receiver by the personal communicator of FIG. 1 to generate position data.

The position data is generated by the position location circuit 42 (see FIG. 2) within the housing 40 of the personal communicator 10. There are a variety of techniques used by the position location circuit 42 to generate the position data. In a preferred embodiment, the position location circuit 42 includes a conventional Global Positioning System (GPS) receiver 80, shown in FIG. 4. The GPS receiver 80 is coupled to the antenna 48 and operates in conjunction with a series of twenty-four satellites in orbit around the earth. The principles of operation of the GPS receiver 80 are illustrated in FIG. 5 where a portion of the twenty-four satellites are designated by the reference numeral 100. The GPS receiver 80 within the housing 40 detects signals from several of the closest satellites 100 and determines the position of the personal communicator 100 using standard triangulation techniques. Using a conversion technique known as differential GPS, the GPS receiver 80 can typically pinpoint the position of the personal communicator 100 to within a few yards anywhere on the planet. The position data generated by the GPS receiver 80 is transmitted to the radio tower 20 by the transmitter 44 within the personal communicator 10. The GPS receiver 80 utilizes a conventional GPS integrated circuit chip set to generate the position data. The personal communicator 10 includes a GPS indicator 102 (see FIG. 3) to indicate to the user that the signal from the satellites 100 is sufficiently strong to derive the position data from the GPS receiver 80. It should be noted that the personal communicator 10 can also be used as a standalone GPS receiver 80 to allow the user to determine his precise location.

The GPS receiver 80 is capable of providing very accurate position data, but suffers from the drawback of inaccurate position data when the GPS receiver does not receive clear signals from the satellites 100. For example, when the GPS receiver 80 is in an urban location, tall buildings may interfere with reception of signals from the satellites 100. For the same reason, the GPS receiver 80 does not operate well when it is located too near the user's body because the body interferes with reception of signals from the satellites 100. Furthermore, the GPS receiver 80 does not operate within buildings because the signals from the satellites 100 are blocked. Therefore, there are certain situations in which the GPS receiver 80 cannot provide accurate position data for the personal communicator 10. In situations where the GPS receiver 80 does not receive a strong enough signal from the satellites 100, the GPS indicator 102 is not illuminated.

The position location circuit 42 also includes additional circuits to generate the position data when the GPS receiver 80 does not have a sufficiently strong signal from the satellites 100. Returning again to FIG. 4, the position location circuit 42 also includes a phone book storage area 84 to generate the position data. The phone book storage area 84 may be part of the memory 54 (see FIG. 2). The operation of portable electronic telephone books is well known and will not be discussed in detail herein. The phone book storage area 84 contains a plurality of telephone numbers and addresses. The user activates the phone book storage area 84 using the SELECT button 12f in the manner previously described. When activated, the contents of at least a portion of the phone book storage area 84 is provided to the user on the display 16 (see FIG. 2). The programmable buttons 12c, 12d, and 12e can be relabeled as scrolling control buttons to permit the user to scroll through the entire contents of the phone book storage area 84. The user selects the entry in the phone book storage area 84 that corresponds to his current location by depressing the SELECT button 12f. The personal communicator 10 uses the information from the phone book storage area 84 as the position data as well as the position data from the GPS receiver 80. The phone book storage feature of the personal communicator 10 is particularly advantageous when the user has a number of locations that are regularly visited. For example, if the user is a salesperson who regularly visits ten different clients, the phone book storage area 84 could contain names, addresses and phone numbers for each of the ten clients, as well as information for additional locations such as home, health club, and the like.

Data can be entered into the phone book storage area 84 by a number of well known techniques. The SELECT button 12f (see FIG. 3) can be used to cause the display 16 to display alphanumeric data. The programmable buttons 12c, 12d, 12e, and 12f can be used to select particular characters for entry into the phone book storage area 84. Alternatively, data can be downloaded into the phone book storage area 84 from the other entity 22 (see FIG. 1) using the receiver 46 (see FIG. 2) within the personal communicator 10. Data can also be downloaded into the phone book storage area 84 using the I/O port 58. It should be noted that the personal communicator 10 can also function as a convention portable electronic phone book using the phone book storage area 84.

In addition to the GPS receiver 80 and the phone book storage area 84, the position location circuit 42 also includes an audio input circuit 88 to permit the user to enter his current location by voice. The voice position data is relayed to the central communications facility 22 in the manner previously described with respect to other forms of data. A microphone 88 permits user entry of voice position data. In a preferred embodiment, the audio input circuit 86 also includes an analog-to-digital converter (ADC) 90 to digitize the voice position data. Although the ADC 90 is not essential to the satisfactory operation of the system, many forms of communication, such as cellular data communications, utilize digital technology to reduce the susceptibility to interference from noise. The audio position data entry capability of the personal communicator 10 is particularly advantageous when the user visits numerous locations only occasionally and does not wish to enter every possible location in the phone book storage area 84. For example, if the user is a real estate salesperson, there are many locations that are visited in a single day. The numerous locations that are visited and the unpredictable nature of the user's schedule make it bothersome to enter each location into the phone book storage area 84. Instead, the user simply enters his present location using the audio input circuit 86 to enter his current location. The audio input circuit can also be used to locate the user within a large complex, such as a factory where there may be too many possible locations to enter into the phone book storage area 84. It should be noted that the personal communicator 10 can use the audio input circuit 86 as a conventional voice messaging system wherein a voice message from the user is transmitted to the other entity 22 by the transmitter 44.

As described above, the voice data from the personal communicator 10 may be in analog form or in digital form if the audio input circuit 86 includes the ADC 90. The voice data processing ability of the other entity 22 must correspond to the voice data processing capability of the personal communicator 10. The voice data processing capability of the other entity 22 can be as simple as a recording system to record the voice data received from the personal communicator 10. Alternatively, the other entity 22 may have a complex voice recognition system that automatically responds to the user's voice to generate specific service requests.

As previously discussed, the sound generator 50 can be used in conjunction with the position location circuit 42 to help locate the user. For example, if the user is in a large building, the GPS receiver 80 cannot provide accurate position data. If the user has indicated that his location is on a particular floor in the large building (using either the phone book storage area 84 or the audio input circuit 86), the sound generator 50 can be manually activated by the user in the manner previously described, or remotely activated by commands from the other entity 22 to provide additional location assistance.

The personal communicator 10 thus provides several alternative techniques for generating position data. In the presently preferred embodiment, all forms of position data are transmitted to the central communications facility 22 along with a "time/date" stamp for each form of position data. The time/date stamp is provided by the real time clock 56 (see FIG. 2). The other entity 22 uses the time/date stamp to determine which form of position data is most current and/or reliable. For example, when the AUTO button 12d (see FIG. 3) is activated, the position data from the GPS receiver 80 (see FIG. 4), the phone book storage area and possibly from the audio input circuit 86 are all transmitted to the other entity 22, each with a corresponding time/date stamp. The time/date stamp indicates when the position data from each source was generated. For example, the GPS receiver 80 may have current position data and will thus have a current time/date stamp. However, the position data from the phone book storage area 84 may not have been updated for several days, with the corresponding time/date stamp indicating the time and date when the position data from the phone book storage area was last updated by the user. The personnel at the other entity 22 will not rely on the position data from the phone book storage area 84 because it is out of date. Therefore, the position data from the GPS receiver 80 will be used to locate the user.

The position data generated by the position location circuit 42 is transmitted by the transmitter 44 within the personal communicator 10. There are numerous possible forms of transmission that can be used by the personal communicator 10. In a preferred embodiment, the personal communicator 10 can be linked to the other entity 22 via a conventional "packet data communications link." The term packet data communications link refers to numerous types of conventional radio communication. Such forms include cellular digital packet data (CDPD), such as systems provided by McCaw Cellular Communications of Delaware, and radio packet data systems such as RAM Mobile Data of Woodbridge, New Jersey, and ARDIS of Lincolnshire, Illinois, narrow-band personalized communications system (PCS), such as provided by SkyTel of Jackson, Mississippi, specialized mobile radio (SMR) or enhanced SMR, such as provided by Nextel of Philadelphia. For example, cellular data systems are becoming widespread throughout the world. In a preferred embodiment, the personal communicator 10 utilizes cellular data technology to communicate with the other entity 22 using cellular digital packet data (CDPD) to communicate with the other entity. In this embodiment, the transmitter 44 is a CDPD transmitter, while the receiver 46 (see FIG. 2) is a CDPD receiver. The operation of cellular data communications is well understood and will not be discussed in detail herein. If the transmitter 44 and receiver 46 are cellular data components, the radio tower 20 (see FIG. 1) is part of the cellular data system. The other entity 22 is linked to the cellular data system. Thus, the personal communicator 20 is in communication with the other entity 22 via a cellular data link.

Alternatively, the personal communicator 10 can communicate with the other entity 22 using an analog data link, such as amateur radio, citizen's band, very high frequency (VHF), ultrahigh frequency (UHF), or the like. These forms of analog communication are well known in the art and need not be described herein.

The personal communicator 10 has been described above as a complete communications device containing the transmitter 44 (see FIG. 2) and the receiver 46. However, the personal communicator 10 can be easily adapted to operate with existing communications devices. For example, the transmitter and receiver portions (not shown) of a radio telephone or cellular telephone can be used as the transmitter 44 and receiver 46. The remaining elements, such as the position location circuit 42, button 12, display 16, sound generator 50, microprocessor controller 52, memory 54, real time clock 56, I/O port 58 are incorporated into the personal communicator 10 for use with the existing communications device. The battery 62 can supply power to the personal communicator 10. Alternatively, the existing communications device can provide power to the personal communicator 10 in a conventional manner. Thus, the personal communicator 10 can be added on to existing communications devices to reduce the number of devices that an individual must carry with him.

As previously discussed, the sound generator 50 and other functions of the personal communicator 10 can be remotely controlled from the other entity 22. The other entity 22 sends commands that are received by the receiver 46 (see FIG. 2) in the personal communicator 10. For example, the personnel at the other entity 22 can send commands to override any of the buttons 12 on the personal communicator 10. If the personal communicator 10 includes an ON/OFF button (not shown), it can also be overridden by commands from the other entity 22. This is particularly advantageous if, for example, the user has been assaulted and the attacker has turned off the personal communicator 10. If the personal communicator 10 is given to a teenage child for use, the other entity 22 can be instructed by the user to send an override command to the ON/OFF button so that the teenage child cannot disable the personal communicator. Many of these functions can also be selected from scroll menus on the personal communicator 10 in the manner previously described.

To conserve energy in the battery 62 (see FIG. 2), the personal communicator 10 remains in a sleep state unless activated by the user or the real time clock 56 (see FIG. 2). The user activates the personal communicator 10 by depressing one of the buttons 12. If the user does not activate the personal communicator 10 for some predetermined period of time, the real time clock 56 acts as a watchdog timer and activates the personal communicator 10 to "check in" with the other entity 22. The use of watchdog timers is well known in the art and will not be discussed in detail herein. The real time clock 56 in the personal communicator 10 typically activates the personal communicator once per day if the user has not activated in at least once in the previous twenty-four hours. However, as with other functions in the personal communicator 10, the period of the real time clock 56 can be remotely set with commands from the other entity 22. For example, the user may be involved in some activity, such as mountain climbing, that warrants a more frequent check of the operation of the personal communicator 10. The user notifies personnel at the other entity 22 of such an event. Commands can be transmitted to the real time clock 56 in the personal communicator 10 to check in every hour for example. In this manner, the user can have greater assurance that the personal communicator 10 is operating normally. If the personal communicator 10 becomes disabled or damaged, the other entity 22 becomes aware of the problem when the personal communicator does not automatically check in at the proper time.

While no communication device can operate with complete reliability, the personal communicator 10 provides great reliability and flexibility in the generation of the position data using a variety of alternative techniques, as well as the ability to remotely operate the personal communicator. The personal communicator 10 can be easily operated and has flexible programming capability of the various buttons 12.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A personal emergency communicator system comprising:
   a housing sized to be personally portable;
   a first location circuit within said housing to generate first position data,
   a phone book storage area within said housing, said phone book storage area containing a plurality of data entries including location data corresponding to each of said plurality of data entries to generate second position data;
   a transmitter within said housing to transmit data comprising one of said first position data and said second position data; and
   a receiver within said housing to receive remote command data.

2. The system of claim 1 wherein said transmitter and receiver communicate over a cellular digital packet data link.

3. The system of claim 1 wherein said first position location circuit includes a global positioning system circuit.

4. The system of claim 1 further comprising a display coupled to said housing for user viewing of data and commands.

5. The system of claim 4 wherein at least a portion of said position data is displayed on said display to permit user selection of said position data.

6. The system of claim 4 wherein at least a portion of said data and commands are received by said system from a remote communications center and displayed on said display.

7. The system of claim 1 further comprising a voice activated position location circuit within said housing to allow the transmission of alternative position data in the form of a complete voice message to a remote communications center.

8. The system of claim 1 further comprising a plurality of command buttons coupled to said housing and responsive to user input for controlling the operation of said system.

9. The system of claim 1 further comprising a sound generator within said housing to generate an audible sound in response to a remote sound generation command.

10. A portable personal communication method comprising the steps of:
    sensing a command;
    determining user location from primary position data;
    providing alternative position data including the steps of accessing a phone book storage area containing a plurality of data entries, including location data corresponding to said data entries and sensing user input to select a particular data entry from said phone book storage area to supplement said primary position data; and
    transmitting at least one of said primary and secondary position data to a service provider.

11. The method of claim 10 wherein said sensing step includes sensing user input from one of a plurality of buttons.

12. The method of claim 10 wherein said sensing step includes sensing a command from a remote communications center.

13. The method of claim 10 further comprising receiving commands and data from a remote communications center and displaying said data and commands on a display coupled to the housing.

14. The method of claim 10 wherein said determining step includes receiving and processing global positioning system data.

15. The method of claim 10 wherein said transmitting step uses a cellular digital packet data communications link.

16. The method of claim 13, further including the step of generating sound in response to a remote command.

17. A personal emergency communicator which enables a user to inform a remote site of a present location of the user, comprising:

a housing sized to be personally portable;

a transmitter within said housing;

a position location circuit coupled to the transmitter to transmit user location data to the remote site, the position location circuit comprising a memory which stores a plurality of phone book entries entered by the user, and which stores site location data in association with the phone book entries; and a user interface which enables the user to select a phone book entry, and to initiate a transmission of the site location data associated with the phone book entry to the remote site.

18. The personal emergency communicator of claim 17 further comprising a location data recordation circuit which is coupled to the user interface to enable the user to record site location data in association with a selected phone book entry.

19. The personal emergency communicator of claim 18 wherein the location data recordation circuit comprises a voice recorder which records a voice message to be transmitted to the remote site.

* * * * *

UNITED STATES PATENT AND TRADEMARK OFFICE
CERTIFICATE OF CORRECTION

PATENT NO. : 5,797,091
DATED : August 18, 1998
INVENTOR(S) : William E. Clise; Richard Michael Crowson It is certified that error appears in the above-identified patent and that said Letters Patent is hereby corrected as shown below:

Column 10, line 10, change "data," to --data;--

Column 12, line 11, change "site location to --site-location--

Column 12, line 15, change "voice message to --voicemessage--

Signed and Sealed this

Twenty-ninth Day of June, 1999

Attest:

Q. TODD DICKINSON

*Attesting Officer*    Acting Commissioner of Patents and Trademarks